United States Patent
Choi et al.

(10) Patent No.: US 11,936,502 B2
(45) Date of Patent: Mar. 19, 2024

(54) METHOD AND DEVICE FOR CHANNEL ESTIMATION IN WIRELESS COMMUNICATION SYSTEM SUPPORTING MIMO

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Yongyun Choi, Suwon-si (KR); Hwanjin Kim, Daejeon (KR); Chulhee Jang, Suwon-si (KR); Junil Choi, Daejeon (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/919,425

(22) PCT Filed: Apr. 16, 2021

(86) PCT No.: PCT/KR2021/004829
§ 371 (c)(1),
(2) Date: Oct. 17, 2022

(87) PCT Pub. No.: WO2021/210959
PCT Pub. Date: Oct. 21, 2021

(65) Prior Publication Data
US 2023/0198810 A1  Jun. 22, 2023

(30) Foreign Application Priority Data

Apr. 17, 2020 (KR) ........................ 10-2020-0047044

(51) Int. Cl.
*H04L 25/02* (2006.01)
*H04W 64/00* (2009.01)

(52) U.S. Cl.
CPC ...... *H04L 25/0204* (2013.01); *H04L 25/0222* (2013.01); *H04W 64/006* (2013.01)

(58) Field of Classification Search
CPC ............. H04L 25/0204; H04L 25/0222; H04L 25/0254; H04L 25/0242; H04W 64/006; H04B 7/0413; H04B 17/309
See application file for complete search history.

(56) References Cited

U.S. PATENT DOCUMENTS

| 2002/0045462 A1* | 4/2002 | Mottier ................ H04B 7/0851 455/526 |
| 2004/0023662 A1 | 2/2004 | Park et al. |

(Continued)

FOREIGN PATENT DOCUMENTS

| KR | 10-0370422 B1 | 2/2003 |
| KR | 10-2006-0000054 A | 1/2006 |

(Continued)

OTHER PUBLICATIONS

3GPP; 3rd Generation Partnership Project; Technical Specification Group Radio Access Network; Study on channel model for frequencies from 0.5 to 100 GHz (Release 16); 3GPP TR 38.901; V16.1.0; Dec. 2019; Valbonne, France.

(Continued)

*Primary Examiner* — Sung S Ahn
(74) *Attorney, Agent, or Firm* — Jefferson IP Law, LLP

(57) ABSTRACT

Disclosed is a method for estimating a channel of a terminal by a base station in a wireless communication system supporting multiple antennas, the method comprising the steps of: estimating a moving speed of the terminal on the basis of a first channel value acquired at a current time point and a second channel value acquired at a previous time point; determining, on the basis of the estimated moving speed, a complexity degree corresponding to the number of channel values for multiple time points including the current time point; and estimating a channel of the terminal at a next time point on the basis of the determined complexity degree.

15 Claims, 12 Drawing Sheets

(56) References Cited

U.S. PATENT DOCUMENTS

2005/0286406 A1   12/2005  Jeon et al.
2008/0240260 A1*  10/2008  Heidari .............. H04B 17/3911
                                                          375/341
2019/0277957 A1    9/2019  Chandrasekhar et al.

FOREIGN PATENT DOCUMENTS

KR    10-0664277  B1    1/2007
KR    10-1415200  B1    7/2014

OTHER PUBLICATIONS

International Search Report with Written Opinion and English translation dated Jul. 23, 2021; International Appln. No. PCT/KR2021/004829.
Korean Office Action with English translation dated Dec. 18, 2023; Korean Appln. No. 10-2020-0047044.

* cited by examiner

METHOD AND DEVICE FOR CHANNEL ESTIMATION IN WIRELESS COMMUNICATION SYSTEM SUPPORTING MIMO

CROSS-REFERENCE TO RELATED APPLICATION(S)

This application is a U.S. National Stage application under 35 U.S.C. § 371 of an International application number PCT/KR2021/004829, filed on Apr. 16, 2021, which is based on and claims priority of a Korean patent application number 10-2020-0047044, filed on Apr. 17, 2020, in the Korean Intellectual Property Office, the disclosure of which is incorporated by reference herein in its entirety.

TECHNICAL FIELD

The disclosure relates to a method and a device for channel estimation in a wireless communication system supporting multiple input multiple output (MIMO) (hereinafter referred to as MIMO system), and to a method and a device for estimating or predicting an uplink channel of a user equipment (UE) in a base station using multiple antennas.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Wireless communication systems are now evolving to support higher data transfer rates and install more access points (APs), so as to satisfy demands for wireless data traffic and wireless connectivity of continuously increasing terminals. For example, to increase data transfer rates, communication systems are being developed to improve spectral efficiency and increase channel capacities based on various schemes such as orthogonal frequency division multiplexing (OFDM) and multiple input multiple output (MIMO).

In wireless local area network (WLAN) systems, multiple user-multiple input multiple output (MU-MIMO), which is a scheme using multiple users and multiple antennas together, has been used to support large-volume data services.

Since the advent of LTE-based 4G mobile communication, multiple input multiple output (MIMO) technology using multiple antennas has become an essential core technology in mobile communication. Recently, MIMO technology has developed into massive MIMO, etc., and theoretically even infinite antennas are being considered. 5G mobile communication uses beamforming and massive MIMO technology. Beamforming is a technology that produces a radio beam through multiple antenna elements such that an antenna intensively transmits and receives radio waves in a specific direction. A base station antenna detects a user's location and then intensively transmits radio waves to a corresponding UE. MIMO is a smart antenna technology to increase the capacity of wireless communication. MIMO technology is a technology that increases the amount of data transmission by allowing a base station and a UE to use multiple antennas and allowing the multiple antennas to transmit and receive signals simultaneously. MIMO technology is a technology that increases the amount of data transmission by allowing a base station and/or a UE to use multiple antennas and allowing the multiple antennas to transmit and receive signals at once. The MIMO technology is largely classified into a spatial diversity technology, a beamforming technology, and a spatial multiplexing (SM) technology. Recently, multi-user MIMO (MU-MIMO) technology in which beamforming and spatial multiplexing technology are combined with each other has emerged, and thus, the existing spatial multiplexing technology has been called single user MIMO (SU-MIMO). A massive MIMO (also known as massive MIMO) system is considered to be an important transition technology to improve the spectral efficiency of fifth-generation (5G) cellular communication. Through massive MIMO, free signal may be used processing in the system, interference between UEs and between cells may be reduced, computational complexity may be reduced, and communication link quality may be improved. In addition, through massive MIMO, the power consumption of a single antenna unit may be reduced and the power efficiency of the system may be improved. A base station device and a mobile device in the future may employ a much larger number of antennas than they do today. In the current prototype testing system, the usability and industrial applicability of a system having more than 64 antennas have been tested.

The massive MIMO system using a large number of antennas for a transceiver is considered to be very important one of the technologies that will play an important role in future wireless communication systems, and is being actively studied.

However, since a large number of antennas are used in a base station (BS), it is difficult to immediately estimate a channel change due to a moving user equipment (UE). It is also known that a data transfer rate decreases due to the channel change due to the moving UE. In the above-mention massive MIMO system, the amount of channel information increases in the channel estimation process due to the use of a massive array antenna, thereby requiring a large amount of feedback, and a channel estimation time occupies a large part compared with a data transmission time.

In order to solve the problem caused by the channel change, various channel estimation methods are being studied. Representative examples of the conventional channel estimation methods include an autoregressive model (AR model) and an autoregressive moving-average model (ARMA model).

DETAILED DESCRIPTION OF THE INVENTION

Technical Problem

The disclosure proposes a method and a device for efficiently estimating or predicting, when a channel of a UE moving in a massive MIMO system changes, the changing channel by a base station.

In addition, the disclosure proposes a method and a device for estimating the mobility of a UE with low complexity when an uplink channel of the UE moving in the massive MIMO system changes.

In addition, the disclosure proposes a method and a device for estimating the uplink channel of a UE based on a complexity order for UE channel estimation determined based on the mobility of the UE in the massive MIMO system.

In addition, the disclosure proposes a method and a device for estimating an uplink channel of a UE by using a machine learning-based method for preprocessing a signal received from the UE in a massive MIMO system.

Technical Solution

In the disclosure, a channel is predicted through a Kalman filter-based and a machine learning-based method.

An embodiment of the disclosure provides a method for estimating a channel of a UE by a base station in a wireless communication system supporting multiple antennas, the method including estimating a movement speed of the UE based on a first channel value obtained at a current time point and a second channel value obtained at a previous time point, determining, based on the estimated movement speed, a complexity order corresponding to the number of channel values for multiple time points including the current time point, and estimating a channel of the UE at a next time point, based on the determined complexity order.

An embodiment of the disclosure provides the channel estimation method wherein the movement speed is estimated using Equation $$\text{Re}\left(\frac{h_{n-1}^H h_n}{\|h_{n-1}\|\|h_n\|}\right).$$

In the above-mentioned Equation, $h_n$ denotes the first channel value at the current time point, $h_{n-1}$ denotes the second channel value at the previous time point, $h^H$ denotes the conjugate transpose of vector h, Re(•) denotes the real part, and $\|\cdot\|$ is the norm operator of a vector.

An embodiment of the disclosure provides the channel estimation method wherein the complexity order is proportional to the amount of change in a channel according to movement of the UE.

Another embodiment of the disclosure provides the channel estimation method wherein the complexity order corresponds to the number of multiple signals received from the UE through multiple channels at the multiple time points, and the complexity order is determined by a ratio value of the movement speed.

Another embodiment of the disclosure provides the channel estimation method wherein the estimating of the channel at the next time point further includes preprocessing the multiple received signals to obtain multiple channel vectors, and the preprocessing uses a linear minimum mean square error estimation (LMMSE) method.

Another embodiment of the disclosure provides the channel estimation method wherein the estimating of the channel at the next time point further includes estimating the channel at the next time point through a multi-layer perceptron (MLP) into which the multiple channel vectors obtained through the preprocessing are input, and the MLP has a structure including at least one hidden layer for updating multiple weights used to estimate the channel at the next time point.

Another embodiment of the disclosure provides the channel estimation method further including training through which multiple weights are updated in the MLP, wherein the multiple weights are updated such that a channel value at the next time point, at which the loss of a cost function is minimized in the training, is estimated.

Another embodiment of the disclosure provides the channel estimation method wherein the estimating of the channel at the next time point further includes estimating a channel value at the next time point by using a channel value at the current time point and a channel value at the previous time point through a Kalman filter.

Another embodiment of the disclosure provides the channel estimation method wherein the channel estimation using the Kalman filter includes calculating a minimum prediction mean square error (MSE) matrix such that the channel value at the next time point is estimated or corrected using the channel value at the current time point, determining a Kalman gain matrix by using the estimated MSE matrix, and estimating the channel at the next time point by using the Kalman gain matrix.

An embodiment of the disclosure provides a base station for estimating a channel of a UE in a wireless communication system supporting multiple antennas, the base station including a transceiver; and a processor, wherein the processor is configured to estimate a movement speed of the UE based on a first channel value obtained at a current time point and a second channel value obtained at a previous time point, determine, based on the estimated movement speed, a complexity order corresponding to the number of channel values for multiple time points including the current time point, and estimate a channel of the UE at a next time point, based on the determined complexity order.

An embodiment of the disclosure provides the base station wherein the processor is configured to estimate the movement speed by using Equation $$\text{Re}\left(\frac{h_{n-1}^H h_n}{\|h_{n-1}\|\|h_n\|}\right),$$

wherein $h_n$ denotes the first channel value at the current time point, $h_{n-1}$ denotes the second channel value at the previous time point, $h^H$ denotes the conjugate transpose of vector h, Re(•) denotes the real part, and $\|\cdot\|$ is the norm operator of a vector.

An embodiment of the disclosure provides the base station wherein the complexity order is proportional to the amount of change in a channel according to movement of the UE.

An embodiment of the disclosure provides the base station wherein the complexity order corresponds to the number of multiple signals received from the UE through multiple channels at the multiple time points, and the processor is configured to determine the complexity order by a ratio value of the movement speed.

Another embodiment of the disclosure provides the base station wherein the processor is configured to preprocess the multiple received signals to obtain multiple channel vectors, and the preprocessing uses a linear minimum mean square error estimation (LMMSE) method.

Another embodiment of the disclosure provides the base station wherein the processor is configured to estimate the channel at the next time point through a multi-layer perceptron (MLP) into which the multiple channel vectors obtained through the preprocessing are input, and the MLP has a structure including at least one hidden layer for updating multiple weights used to estimate the channel at the next time point.

Another embodiment of the disclosure provides the base station wherein the processor is configured to update multiple weights in the MLP through training, and update the multiple weights such that a channel value at the next time point, at which the loss of a cost function is minimized in the training, is estimated.

Another embodiment of the disclosure provides the base station wherein the processor is configured to estimate a channel value at the next time point by using a channel value at the current time point and a channel value at the previous time point through a Kalman filter.

Another embodiment of the disclosure provides the base station wherein the processor is configured to, calculate a minimum prediction mean square error (MSE) matrix such that a channel value at the next time point is estimated or corrected using a channel value at the current time point, determine a Kalman gain matrix by using the estimated MSE matrix, and estimate the channel at the next time point by using the Kalman gain matrix.

Other aspects, advantages, and salient features of the disclosure will become apparent to those skilled in the art from the following detailed description, which, taken in conjunction with the annexed drawings, discloses exemplary embodiments of the disclosure.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same.

It should be noted that the functionality associated with any particular controller may be centralized or distributed, whether locally or remotely. It should be understood that definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

It should be noted that throughout the drawings, like reference numerals are used to denote the same or similar elements, features, and structures.

MODE FOR CARRYING OUT THE INVENTION

Figure 1:
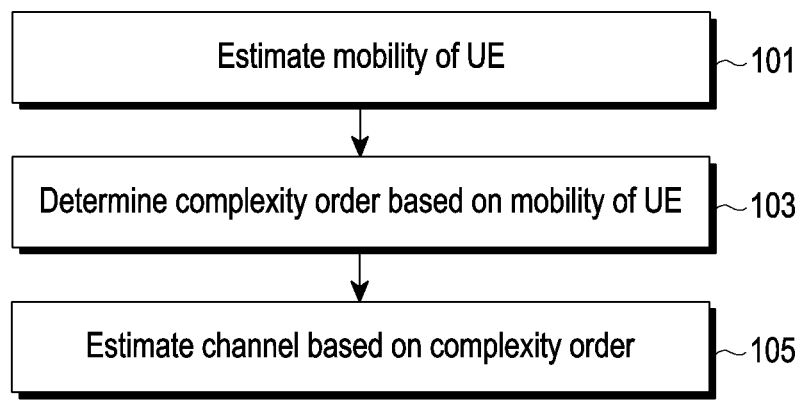
FIG. 1 shows a flow of a method for predicting a channel based on the mobility of a UE proposed in the disclosure.

Hereinafter, embodiments according to the disclosure will be described in detail with reference to the accompanying drawings. It should be noted that, in the drawings, the same or like elements are designated by the same or like reference signs as much as possible. In describing the disclosure, a detailed description of known technologies or configurations incorporated herein will be shortened or omitted when it is determined that the description may make the subject matter of the disclosure unnecessarily unclear.

Hereinafter, embodiments of the disclosure will be described in detail with reference to the accompanying drawings. It should be noted that, in the following description, only parts necessary for understanding of operations according to embodiments of the disclosure will be described, and a description of the other parts will be omitted so as not to make the subject matter of the disclosure obscure. The terms which will be described below are terms defined in consideration of the functions in embodiments of the disclosure, and may be different according to users, intentions of the users, or customs. Therefore, the definitions of the terms should be made based on the contents throughout the specification.

Various changes and modifications may be made to the disclosure, and the disclosure may have various embodiments, some of which will be described in detail with reference to the accompanying drawings. However, it should be appreciated that they are not intended to limit the disclosure to particular embodiments and the disclosure include various changes, equivalents, or alternatives falling within the sprit and scope of the disclosure.

Furthermore, in the specification, it will be understood that singular forms such as "a," "an," and "the" cover plural expressions unless the context clearly indicates otherwise. Therefore, as an example, reference to "a component surface" covers reference to one or more such surfaces.

Furthermore, the terms including an ordinal number, such as "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure. The term "and/or" includes any one or combinations of a plurality of relevant items enumerated.

Furthermore, the terms used in the specification are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Various embodiments as set forth herein may be implemented as software (e.g., a program) including one or more instructions that are stored in a storage medium (e.g., an internal memory or external memory) that is readable by an electronic device. For example, a processor of an electronic device may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Furthermore, according to embodiments of the disclosure, the electronic device may provide a channel for wireless communication with a terminal. The electronic device may mean a base station, an access network (AN), a radio access network (RAN), an eNB, an eNodeB, a 5G node, a transmission/reception point (TRP), a 5th generation NodeB (5 gNB), and the like. For the sake of convenience, in the following description of embodiments of the disclosure, the electronic device will be illustrated as a base station. The terminal may mean a user equipment (UE), a mobile station, a user device, and the like that communicates with the base station over a radio channel. In addition, according to embodiments of the disclosure, a MIMO system may be implemented in various wireless communication systems supporting MIMO that is a multi-antenna technology, such as long-term evolution (LTE) systems (hereinafter referred to as "LTE"), long-term evolution-advanced (LTE-A) systems (hereinafter referred to as "LTE-A"), LTE-A pro systems, or the above-described 5G systems proposed by the 3rd generation partnership project (3GPP).

Furthermore, in embodiments of the disclosure, unless separately defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in embodiments of the disclosure.

A method and a device according to an embodiment of the disclosure may be applied to a base station communicating with a UE through a wireless channel in a MIMO system. However, the scope in which the method and the device according to the embodiment of the disclosure are applied is not limited to a base station, and the method and the device may be applied to a UE if the UE is capable of communicating with multiple base stations by using MIMO. Hereinafter, in the exemplified embodiments, it is assumed that a "channel" is an uplink channel from a UE to a base station, and embodiments in which the base station estimates the uplink channel will be described. Here, the channel estimation may be understood as estimating a channel at time point n+1 when it is assumed that a current time point is n and the next time point is n+1. Accordingly, the channel estimation corresponds to estimating an uplink channel at the next time point, and thus may be referred to as channel prediction.

In Equations considered in the disclosure, bold small letters and bold capital letters indicate column vectors and matrices. $A^T$ and $A^H$ denote the transpose and conjugate transpose of matrix A. $\mathbb{E}[\cdot]$ denotes the expected value, and Re(•), Im(•) denotes the real part and the imaginary part, respectively. $\mathbb{C}^{m \times n}$ denotes a m×n complex matrix, |•| denotes the absolute value of a complex number, and ‖•‖ denotes the $\ell_{2,2}$ norm (Euclidean L2-norm) of a vector. $O_m$ denotes an m×n all zero matrix, and $I_M$ denotes an m×n identity matrix. $\mathcal{CN}(m, \sigma^2)$ denotes complex Gaussian noise in which the mean is m and the variance is $\sigma^2$.

It should be noted that the disclosure is not limited to basically a single cell massive MIMO system and that the disclosure may also be applied to multiple cells. The following embodiments consider a communication environment in which a base station uses M antennas and a UE uses a single antenna for convenience of description. A received signal $y_n$ at an n-th time considering a block fading channel model may be expressed by Equation 1 below.

$$y_n = \sqrt{\rho} h_n x_n + w_n \quad \text{Equation 1}$$

$\rho$ denotes a signal-to-noise ratio (SNR), $h_n$ is an n-th channel vector, Xn is an n-th data symbol, and $w_n \sim \mathcal{CN}(0, 1_M)$ is complex Gaussian noise that follows a Complex Gaussian distribution with a mean of 0 and variance of $I_M$ at the n-th time. Xn may be assumed to be 1. That is, a receiver of a base station receives $y_n$ including noise.

An actual channel model may include multiple rays generated by different path gains, delay, Doppler effect, angle-of-arrival (AoA), angle-of-departure (AoD), etc. For example, in the spatial channel model (SCM) of 3GPP, the channel of an m-th path between an s-th base station and a u-th UE at time n may be expressed by Equation 2.

$$h_{u,s,m,n} = \sqrt{\frac{P_m}{L}} \sum_{l=1}^{L} \exp[jkd_s \sin(\theta_{m,l,AoD})] \quad \text{Equation 2}$$

$$\exp[jkd_u \sin(\theta_{m,l,AoA})] \cdot \exp(j\phi_{m,l}) \exp[jk\|v\| \cos(\theta_{m,l,AoA} - \theta_v) n]$$

$P_m$ denotes received power of an m-th path, k denotes a wavenumber (the reciprocal of frequency), $d_s$ denotes the distance between antennas of a base station, and $d_u$ denotes the distance between antennas of a UE. In addition, $\theta_{m,l,AoD}$ denotes the AoD of the first sub-path in the m-th path, $\theta_{m,l,AoD}$ denotes the AoA of the first sub-path in the m-th path, $\phi_{m,l}$ denotes the phase of the first sub-path in the m-th path, $\|v\|$ denotes the magnitude of the speed of the UE, and $\theta_V$ denotes the direction of a speed vector of the UE.

Predicting all channel parameters of the SCM expressed in Equation 2 requires excessive calculation, and it is difficult to accurately estimate a channel in a short time. The disclosure proposes an efficient channel estimation method to solve these problems.

First, Embodiment 1 proposes a method for estimating the mobility of a UE. The mobility estimated in Example 1 may be used to determine the complexity order of a channel estimation method used in Embodiments 2 and 3. Embodiments 2 and 3 propose a Kalman filter-based channel estimation method and a machine learning-based channel estimation method, respectively.

Embodiment 1

Hereinafter, the movement speed (mobility) of a UE and a channel estimation method based on the mobility will be described with reference to FIGS. 1 and 2. The term "mobility" used in the disclosure may be expressed as the "mobility" or "movement speed" of the UE. km/h has been given as an example of the unit thereof, but various units indicating the speed, such as m/s, may be used.

Figure 2:
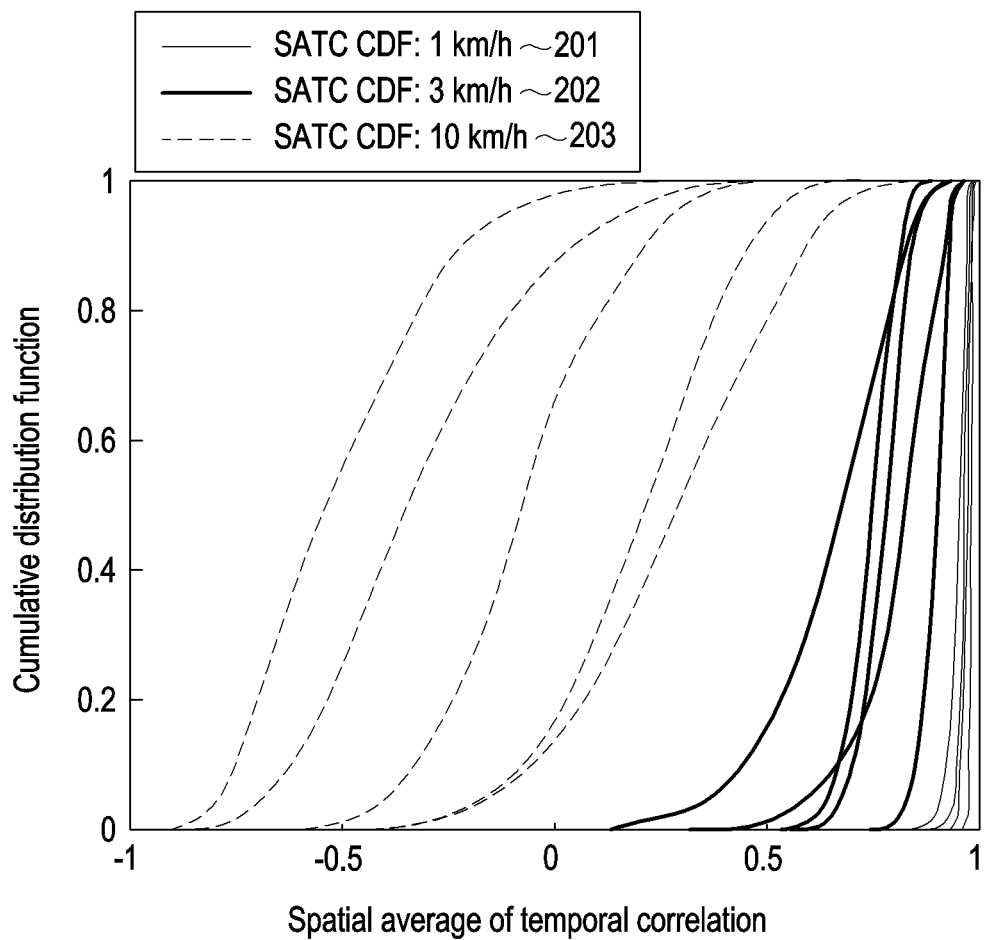
FIG. 2 shows a cumulative distribution function (CDF) of a normalized SATC real part according to a UE movement speed of a spatial channel model (SCM) according to an embodiment of the disclosure.

FIG. 1 illustrates a method for estimating a channel based on the mobility of a UE according to an embodiment of the disclosure.

In operation 101 in FIG. 1, a base station estimates the mobility of the UE, that is, the movement speed thereof. In the disclosure, the mobility may be estimated using a spatial average of temporal correlation (SATC) of the UE. The SATC may be obtained (estimated) using channel estimation values of the UE at least two time points (e.g., a current time point n and a previous time point n−1, or two previous time points n−1 and n−2 as shown in Equation 1 which will be described later. In operation 103, the base station determines, based on the estimated mobility, a complexity order which will be described later and is used to estimate a channel of the UE. The complexity order may correspond to the number of channel values at multiple time points or the number of multiple received signals received from the UE through multiple channels at multiple time points. The multiple time points may include at least one of a current time point and a previous time point. In operation 105, the base station estimates a channel of the UE at a next time point, based on the determined complexity order. The method in the disclosure of determining the complexity order and estimating a channel at the next time point by applying the determined complexity order to the Kalman filter-based channel estimation method or the machine learning-based channel estimation method according to the disclosure will be described in detail in second and third Embodiments that will be described later. The above-mentioned channel estimation method of the disclosure is a method for estimating a channel by reflecting a temporal correlation in signals which a base station using multiple antennas receives from a UE and processing the received signals in which the temporal correlation is reflected.

Specifically, the disclosure proposes a SATC-based mobility estimation method, which is a method for obtaining a temporal correlation of a spatial channel model (SCM) by means of a spatial average by multiple antennas in a base station. The proposed SATC-based mobility estimation method may obtain the spatial average by performing vector multiplication once, and thus has the advantage of significantly lowering complexity compared to the existing mobility estimation method. The proposed low-complexity SATC-based mobility estimator may estimate mobility by temporally using only two snapshots. The two snapshots may be expressed, for example, as channel vectors at two time points, represented by $h_n$, which is a channel vector at an n-th time point, and $h_{n-1}$, which is a channel vector at an (n−1)-th time point. Here, a measured value or an estimated value in a channel may be used as the channel vector. Therefore, the spatial average of multiple antennas may be obtained using two known channel vector values in a MIMO system using multiple antennas, and thus the mobility of the UE may be rapidly estimated with low complexity. In the disclosure, the real part of the normalized SATC may be expressed as in Equation 3 below.

$$\text{Re}\left(\frac{h_{n-1}^H h_n}{\|h_{n-1}\|\|h_n\|}\right) \quad \text{Equation 3}$$

In Equation 3, as the mobility of the UE decreases, the change amount of the channel decreases, so that most of the values of $h_{n-1}{}^H h_n$ are real values, and the real part of the normalized SATC approaches 1. FIG. 2 schematizes a cumulative distribution function (CDF) of an SATC value normalized according to the mobility of the UE. In FIG. 2, it is found that the movement speed of the UE may be distinguished by using the SATC value of the SCM as shown in the cumulative distribution function. That is, when the mobility of the UE is small, for example, when the movement speed of the UE is 1 km/h, the change amount of the channel is decreased and the distribution of cumulative distribution functions is as shown in reference numeral 201. On the other hand, as the movement speed of the UE increases, such as to 3 km/h or 10 km/h, the change amount of the channel increases. Therefore, the distribution of cumulative distribution functions is as shown in reference numerals 203 or 205. Therefore, in the SATC-based mobility estimation for obtaining the temporal correlation by means of a spatial average by multiple antennas, when the real part of the SATC normalized according to Equation 3 is obtained, the mobility, i.e., the movement speed, of the UE may be estimated. A specific example is as follows. When the SATC value is 0.8 or greater, the mobility of the UE may be estimated as 1 km/h, and when the SATC value is 0.5 to 0.8, it can be estimated as 3 km/h, and when the SATC value is 0.5 or less, the mobility of the UE may be estimated as 10 km/h. That is, table information on the mobility of the UE corresponding to the range value of the SATC may be used. In an embodiment for estimating the mobility of the UE, when it is difficult to obtain a specific SATC value for the SCM channel value, that is, when it is difficult to express the SATC value as a specific value such as 0.8 or 0.5, the mobility of the UE may be estimated based on the SATC trend as shown in FIG. 2. When multiple SATC values are used, the mobility of the UE may be estimated with high accuracy based on multiple pieces of information that can make the SATC values and the mobility of the UE correspond to each other. The SATC CDF of the disclosure is based on the SCM channel model as an example.

Embodiment 2

In this embodiment, the mobility of the UE according to an embodiment of the disclosure is applied to a known Kalman filter-based channel estimation algorithm.

In Example 2, a description is described of a method for predicting mobility by using Embodiment 1 to determine the complexity order (AR-order, p), and performing AR parameter estimation by using the Yule-Walker equations, based on the determined complexity order.

Figure 3:
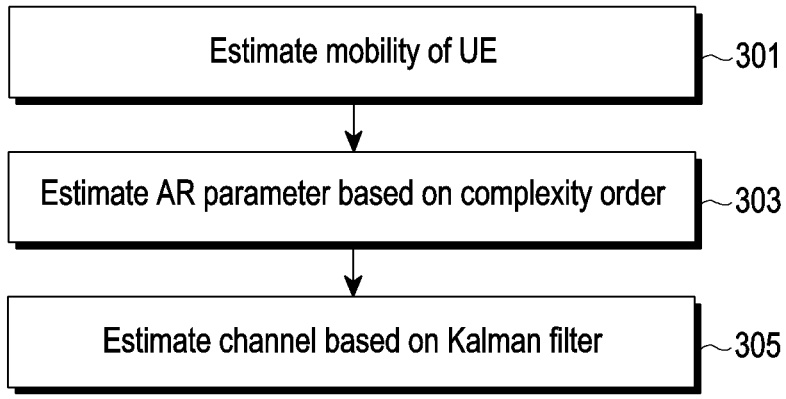
FIG. 3 is a block diagram of a Kalman filter-based channel prediction method proposed in the disclosure.

FIG. 3 illustrates a channel estimation method using a Kalman filter according to an embodiment of the disclosure. Referring to FIG. 3, in operation 301, a base station estimates the mobility of a UE. The mobility of the UE may be estimated using Equation 3 in the first embodiment described above. In operation 303, the base station acquires (estimates) an AR parameter used in an autoregressive model (AR model), based on the estimated mobility of the UE. In operation 305, the base station estimates a channel through the Kalman filter, based on the acquired (estimated) AR parameter. Operations 303 and 305 will be described in detail below.

A vector AR model may be used to estimate a time change of an SCM. A vector AR model of order p, which is the complexity order of the SCM, may be expressed by Equation 4 as follows.

$$h_n = \sum_{i=1}^{p} \Phi_i h_{n-i} + u_n \qquad \text{Equation 4}$$

p is the AR-order of the complexity order, and $\Phi_i$ is an i-th AR parameter matrix, and, $u_n \sim \mathcal{CN}(0,\Sigma)$ is Gaussian noise. Equation 4 shows that a channel value for time point n can be expressed as a linear sum of channel values for time points before n. Here, the minimum complexity order of a temporal channel value required to obtain the channel value for the n time point may be referred to as AR order p. Here, as the value of the complexity order AR order p increases, a more accurate channel value may be estimated. However, since the complexity for signal processing increases in proportion to the AR order p, the optimal complexity order, AR-order p, may be found based on the mobility of the UE estimated through Embodiment 1. The optimal AR-order p may be determined experimentally or by a ratio value of the estimated mobility (e.g., ½ of mobility, etc.). That is, the higher the movement speed of the UE, the greater the amount of change in the channel, so the complexity order will also increase. On the other hand, the lower the movement speed of the UE, the smaller the amount of change in the channel, so the channel may be accurately estimated even by a small complexity order. Accordingly, the AR-order value may be understood as complexity in the process of signal processing for channel estimation.

As described above, the optimal complexity order, AR-order p, may be found based on the mobility of the UE estimated through Embodiment 1 (301). The AR parameter matrix) $\Phi_i$ and a noise covariance matrix) $\Sigma$ may be obtained through the Yule-Walker equation. The Yule-Walker equation may be expressed as Equation 5.

$$[R(1) R(2) \ldots R(p)] = [\Phi_1 \Phi_2 \ldots \Phi_p]\overline{R} \qquad \text{Equation 5}$$

$\overline{R}$ may be expressed by Equation 6.

$$\overline{R} = \begin{bmatrix} R(0) & R(1) & \ldots & R(p-1) \\ R^H(1) & R(0) & \ldots & R(p-2) \\ \vdots & \vdots & \ddots & \vdots \\ R^H(p-1) & R^H(p-2) & \ldots & R(0) \end{bmatrix} \qquad \text{Equation 6}$$

$R(i) = \mathbb{E}[h_k h_{k-1}{}^H]$ is an autocorrelation matrix, and the AR parameter matrix and the noise covariance matrix) $\Sigma$ may be solved by solving Equation 5 as in Equation 7.

$$[\Phi_1 \Phi_2 \ldots \Phi_p] = [R(1) R(2) \ldots R(p)]\overline{R}^{-1} \qquad \text{Equation 7}$$

The noise covariance matrix $\Sigma$ may be obtained as in Equation 8.

$$\Sigma = R(0) - \sum_{i=1}^{p} \Phi_i R(-i) \qquad \text{Equation 8}$$

After estimation of an AR model parameter, a state equation may be expressed as a structured vector AR (1) model as in Equation 9.

$$\underline{h}_n = \overline{\Phi} \underline{h}_{n-1} + \overline{\Theta} u_n \qquad \text{Equation 9}$$

$\underline{h}_n[h_n{}^T \ldots h_{n-p+1}{}^T]^T \in \mathbb{C}^{m \times n}$ is a state vector, $u_n \sim \mathcal{CN}$ (0, Σ) is system noise, and the transition matrix $\overline{\varphi}$ and $\overline{\theta}$ may be expressed by Equations 10 and 11.

$$\overline{\Phi} = \begin{bmatrix} \Phi_1 & \Phi_2 & \ldots & \Phi_{p-1} & \Phi_p \\ I_M & 0_M & \ldots & 0_M & 0_M \\ 0_M & I_M & \ldots & 0_M & 0_M \\ \vdots & \vdots & \ddots & \vdots & \vdots \\ 0_M & 0_M & \ldots & I_M & 0_M \end{bmatrix} \in \mathbb{C}^{Mp \times Mp}$$

Equation 10

$$\overline{\Theta} = \begin{bmatrix} I_M \\ 0_M \\ \vdots \\ 0_M \end{bmatrix} \in \mathbb{C}^{Mp \times M}$$

Equation 11

A measurement equation may be obtained by transforming Equation 1 as shown in Equation 12 below.

$$y_n = s\overline{h}_n + w_n \qquad \text{Equation 12}$$

$s = [\sqrt{\rho}I_M 0_M \ldots 0_M] \in \mathbb{C}^{m \times n}$ is the measurement matrix, and $w_n \sim \mathcal{CN}$ (0,$I_M$) is measurement noise. Since the above Equation 5 to Equation 12 may use a known method, a detailed description of each equation will be omitted. Through the Kalman filter-based estimation method using the state equation and the measurement equation, a final channel estimation value may be obtained using first M entries in $\hat{\underline{h}}_{n+1|n}$. Table 1 below is an example of a Kalman filter-based channel estimation algorithm.

TABLE 1

Algorithm 1 Kalman Filter-Based Channel Predictor

1: Initialization:
　　$\hat{\underline{h}}_{0|0} = 0$, $M_{0|0} = \mathbb{E}[\underline{h}_0 \underline{h}_0{}^H] = \overline{R}$
2: Prediction:
　　$\hat{\underline{h}}_{n+1|n} = \overline{\Phi}\hat{\underline{h}}_{n|n}$
3: Minimum prediction MSE matrix:
　　$M_{n+1|n} = \overline{\Phi} M_{n|n} \overline{\Phi}^H + \overline{\Theta}\Sigma\overline{\Theta}^H$
4: Kalman gain matrix:
　　$K_{n+1} = M_{n+1|n} S^H (SM_{n+1|n} S^H + I_M)^{-1}$
5: Correction:
　　$\hat{\underline{h}}_{n+1|n+1} = \hat{\underline{h}}_{n+1|n} + K_{n+1}(y_{n+1} - S\hat{\underline{h}}_{n+1|n})$
6: Minimum MSE matrix:
　　$M_{n+1|n+1} = (I_{Mp} - K_{n+1}S) M_{n+1|n}$ The algorithm 1 of Table 1 is divided into a prediction part (processes 2 and 3 of Algorithm 1) and a correction part (processes 4-6 of Algorithm 1). First, in process 1 of Algorithm 1, $\hat{\underline{h}}_{0|0}$, $M_{0|0}$ is initialized. In the prediction part, a channel value $\hat{\underline{h}}_{n+1|n}$ at a next time point is predicted using a current channel value, and a minimum prediction mean square error (MSE) matrix $M_{n+1|n}$ is calculated at the same time (processes 2 and 3 of Algorithm 1). In the correction part, a Kalman gain matrix is obtained by using the $M_{n+1|n}$ obtained in the prediction part (process 4 of Algorithm 1). Subsequently, a corrected value $\hat{\underline{h}}_{n+1|n+1}$ is calculated using a previously estimated value $\hat{\underline{h}}_{n+1|n}$, the Kalman gain matrix $K_{n+1}$, and a measurement $y_{n+1}$ (process 5 of Algorithm 1). Finally, a minimum MSE matrix value may be obtained using $M_{n+1|n}$ and $K_{n+1}$ (process 6 of Algorithm 1). That is, Embodiment 2 is an embodiment of a method for estimating a channel value at a next time point by using channel values at a current time point and a previous time point through a Kalman filter. Example 2 does not require additional training when compared with Example 3 that will be described later.

Embodiment 3

In the third embodiment, the mobility of the UE according to the embodiment of the disclosure is applied to a machine learning-based channel estimation method that will be described later.

The machine learning-based methods may be usefully used to solve non-linear and complex problems. When the machine learning-based channel estimation method is used, the inherent characteristics of a channel may be obtained through a relatively simple end-to-end operation. The machine learning-based channel estimation method may estimate and predict a channel even in a non-linear channel model, and thus may be applied to a massive MIMO system.

Figure 4:
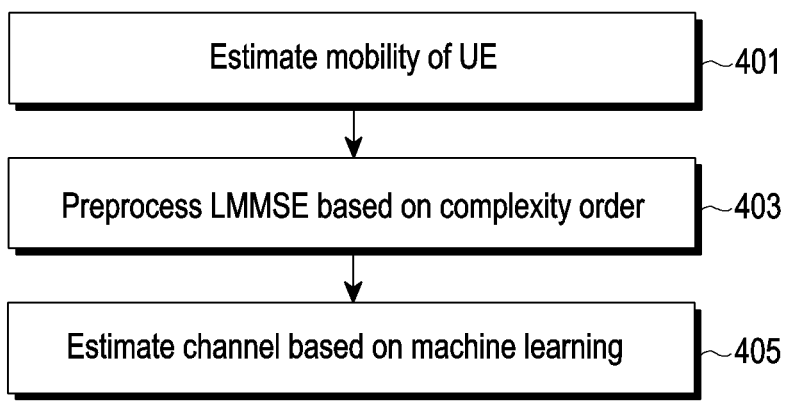
FIG. 4 shows a block diagram of a machine learning-based channel prediction method proposed in the disclosure.

FIG. 4 is a flowchart illustrating a machine learning-based estimation method according to an embodiment of the disclosure.

Referring to FIG. 4, in operation 401, a base station estimates the mobility of a UE. The mobility of the UE may be estimated using Equation 3 in the above-described first embodiment. In operation 403, the base station determines, based on the estimated mobility, a complexity order used to estimate a channel of the UE, and preprocesses received signals by using a linear minimum mean square error estimation (LMMSE) method, based on the determined complexity order. The complexity order may correspond to the number of multiple received signals received from the UE through multiple channels at multiple points. Channel vectors obtained by preprocessing the multiple received signals are used as inputs for a multi-layer perceptron (MLP) for machine learning, and before the inputs, the received signals may be preprocessed using LMMSE such that noise effects are minimized. Accordingly, the number of the multiple received signals may be understood as the number of input-orders in the multi-layer perceptron (MLP). In operation 405, the base station estimates a channel through the multi-layer perceptron (MLP) using the preprocessed channel vectors as inputs. Operations 403 and 405 will be described in detail as follows.

In the disclosure, the multilayer perceptron (MLP) may use a method, known as a feed-forward artificial neural network, of machine-learning input signals through a hidden layer and mapping the input signals to appropriate outputs. The MLP may have various structures, such as a structure having one or more layers, a structure having multiple inputs, a structure having feedback loops in multiple directions, or a structure having multiple layers. A machine learning method/device using the above-mentioned MLP may use "weights" (which may be expressed as values) for multiple connections in one or multiple hidden layers. Also, in the MLP, the weights may be updated by performing training multiple times.

Figure 5:
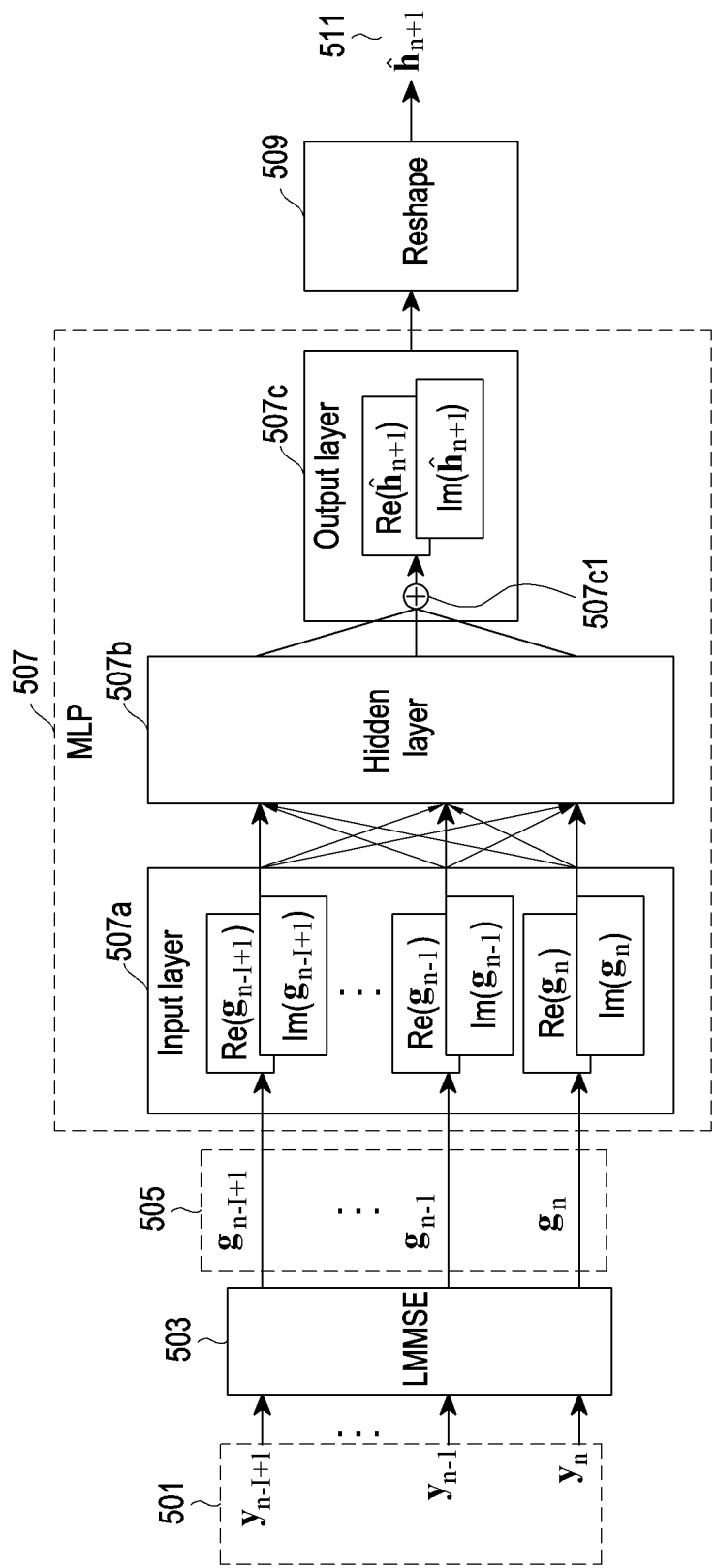
FIG. 5 shows the structure of a multi-layer perceptron (MLP) combined with LMMSE estimation according to an embodiment of the disclosure.

FIG. 5 is a block diagram showing elements of a multi-layer perceptron (MLP) combined with LMMSE according to an embodiment of the disclosure.

The block elements in FIG. 5 includes an LMMSE block 503, an MLP block 507, and a reshape block 509. The LMMSE block 503 preprocesses I received signals $(y_{n-l+1}, \ldots, y_n)$ 501 corresponding to complexity orders to output I channel vectors $(g_{n-l+1}, \ldots, g_n)$ 505. The MLP block 507 receives the preprocessed I channel vectors 505 from an input layer 507a, performs machine learning through a hidden layer 507b, and updates weights used as coefficients of the hidden layer 507b, and the updated weights are calculated and output in an output layer 507c. An output value obtained by calculating and summing input values processed from the input layer 507a to the output layer 507c and the updated weights includes a real component and an imaginary component that constitute an estimated channel value at a next time point. The reshaping block 509 reshapes the output of the output layer 507c to output an estimated channel value for the next time point.

Specifically describing the operation of the MLP block 507 of the elements in FIG. 5, the MLP block 507 may inject label data for training (here, experimental data for training may be used as the label data) into the input layer 507a and the output layer 507c before reception of the received signals, and may update, based on the injected label data, the weight of the hidden layer 507b through training. That is, the MLP 507 performs training to update weights by using known label data, and calculates, based on the trained weights, the preprocessed channel vectors $(g_{n-l+1}, \ldots, g_n)$ from the input layer 507a to the output layer 507c, and outputs real and imaginary components constituting an estimated channel value at a next time point. Here, the training may be periodic, aperiodic, or continuous, but there is an advantage in that when weights acquired by performing training once are used, a channel estimation value at the next time point may be obtained with low complexity. Here, the hidden layer 507 may include multiple fully-connected layers as in the embodiment in FIG. 6.

In the embodiment in FIG. 5, a set of the I reception signals $(y_{n-l+1}, \ldots, y_n)$ 501 corresponding to the complexity orders, described above, includes a total of I received signals from an n-th received signal to an (n−l+1)-th received signal.

In reference number 501 in FIG. 5, the measurement $y_n$ defined in Equation 1 may be used as an input value of the MLP block 507. However, the measurement $y_n$ is noise corrupted data, and thus may not guarantee the performance of channel estimation. Therefore, in the embodiment of the disclosure, preprocessing is also performed for noise by using the linear minimum mean square error estimation (LMMSE) block 503 for rigorous channel estimation. That is, the disclosure is advantageous in that accuracy can be increased because preprocessed $g_n$ with minimized influence of noise is used as input, unlike the existing MLP that directly uses the received signal $y_n$. A value obtained by preprocessing measurement $y_n$ based on LMMSE may be expressed by the following Equation 13. In the following equations, $g_n$ is described as an example of a preprocessed channel vector for convenience of explanation, but actual signal processing is performed in the same way with respect to the I signals corresponding to the complexity orders.

$$g_n = C_{h_n y_n} C_{y_n}^{-1} y_n \qquad \text{Equation 13}$$

$C_{h_n y_n}$ is a cross-covariance matrix of $h_n$ and $y_n$, and $C_{y_n}$ is an auto-covariance matrix of $y_n$. Here, the covariance matrix may be obtained by sampling the measurement.

$$C_{y_n} = \frac{1}{N_s} \sum_{i=1}^{N_s} y_i y_i^H \qquad \text{Equation 14}$$

Ns denotes the number of samples. Measurements at time before estimating may be used as the samples. Furthermore, the relationship of $C_{y_n} = \sqrt{\rho} C_{h_n y_n} + I_M$ is used to obtain $C_{h_n y_n}$. As a result, input-order I LMMSE-based pre-processed channel vectors $\{g_{n-l+1}, \ldots, g_n\}$, which are complexity orders, may be used as inputs of the MLP block 507, instead of measurements $\{y_{n-l+1}, \ldots, y_n\}$. Here, the optimal value of the input-order I may be determined based on the mobility value of the UE estimated in Embodiment 1. For example, the optimal input-order I may be experimentally determined, or may be determined as the ratio value of the estimated mobility (e.g., ½ of mobility, etc.).

In the training operation of the MLP block 507, spatial channel model (SCM) data may be used as label data. A pre-processed channel vector may be used as an input of the MLP block 507, and an estimated channel vector estimated as an output may be obtained. The MLP block 507 may operate with a real number input, and thus may reshape and use the input as an 2M-dimension input-layer. This may be expressed as a real component and an imaginary component of each of the preprocessed channel vectors, which are input vectors. That is, this may include $\text{Re}(g_{n-l+1})$, $\text{I}(g_{n-l+1}), \ldots, \text{Re}(g_n), \text{Im}(g_n)$. Furthermore, the output-layer may be reshaped into $\text{Re}(\hat{h}_{n+1}), \text{Im}(\hat{h}_{n+1})$ of 2M-dimension, which may be used to reconstruct a complex-valued predicted channel vector $\hat{h}_{n+1}$. In the reshaping block of reference number 509, the same is reshaped into $\hat{h}_{n+1} = \text{Re}(\hat{h}_{n+1}) + 1j * \text{Im}(\hat{h}_{n+1})$ by using the output values $\text{Re}(\hat{h}_{n+1})$ and $\text{Im}(\hat{h}_{n+1})$.

Figure 6:
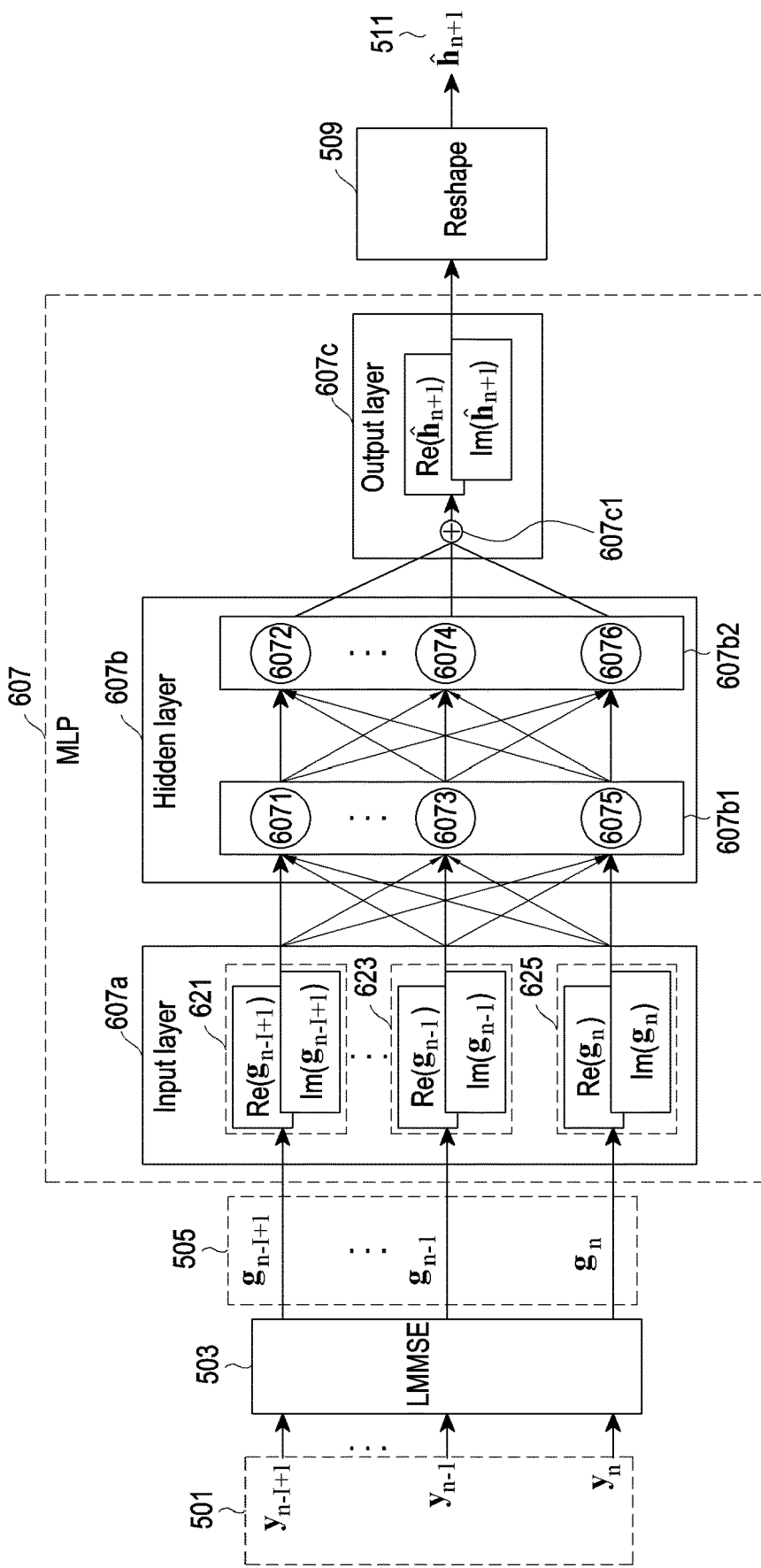
FIG. 6 shows a structure in which a hidden layer has two layers in an MLP combined with LMMSE estimation according to an embodiment of the disclosure.

FIG. 6 is a block diagram illustrating elements of a multi-layer perceptron (MLP) including multiple hidden layers according to an embodiment of the disclosure. In FIG. 6, the same reference numerals are used for the same components as those in FIG. 5, and since the descriptions of the elements are the same as those in FIG. 5, a detailed description thereof will be omitted.

An MLP block 607 in FIG. 6 includes an input layer 607a, multiple hidden layer 607b, and an output layer 607c. In the embodiment of FIG. 6, for convenience, it is illustrated that the number of the multiple hidden layers 607b is two, but the number of hidden layers is not limited to two, and may be equal to or greater than three.

In the case of the MLP block 607 in FIG. 6, an MLP structure having four layers including the input layer 607a, a first hidden layer 607b1, a second hidden layer 607b2, and the output layer 607c is illustrated, and may be called a Deep Neural Network (DNN) because there are two hidden layers. When it is assumed that, in the MLP structure as shown in FIG. 6, the number of input vectors is three, that is, I is 3, and that the number of antennas is one, that is, M is one, an exemplary description of a weight is as follows. Components of an input vector entering the input layer 607a are illustrated as reference numerals 621, 623 and 625. For convenience, it is assumed that the first hidden layer 607b1 includes nodes 6071, 6073, and 6075. In relation to the components 621, 623, and 625 of the input layer, in FIG. 6, components of the input vector, a real part and an imaginary part, are illustrated as one input. However, the MLP block 507 may operate with a real number input, and the input may be reshaped into a 2M-dimension input-layer and used. In this case, the components 621, 623, and 625 of the input layer are expressed as respective real components and imaginary components of the preprocessed channel vectors, which are input vectors. Therefore, since there are a total of six inputs, a [6 by 3] matrix that connects all of the six inputs and the three nodes like a neural network may include 18 weight components $(w_1, w_2, \ldots, w_{18})$. However, for visibility and convenience of description of FIG. 6, the input layer is illustrated as having three input values as the components 621, 623, and 625. At this time, a weight is updated in each of the hidden layers 607b1 and 607b2. The weight matrix is a [3 by 3] matrix that connects all of the components 621, 623, 625 of the input vectors and the nodes 6071, 6073, 6075 like a neural network, and thus has 9 weight components $(w_1, w_2, \ldots, w_9)$. The first hidden layer 607b1 outputs a [3 by 1] matrix by multiplying the [3 by 1] matrix corresponding to the nodes 6071, 6073, and 6075 by a first weight matrix of [3 by 3]. The [3 by 1] matrix output by the first hidden layer is used again as an input in the second hidden layer 607*b*2. It is assumed that there are also three nodes 6072, 6074, and 6076 in the second hidden layer. Similarly, the components of the [3 by 1] matrix output by the first hidden layer and the nodes 6072, 6074, and 6076 of the second hidden layer 607*b*2 may all be connected like a neural network, and similarly, a second weight matrix of the second hidden layer 607*b*2 may exist. The second hidden layer 607*b*2 outputs a value obtained by multiplying the [3 by 1] matrix output by the first hidden layer 607*b*1 by the [3 by 3] matrix which is the second weight matrix. Finally, weights exist in each neural network connecting the second hidden layer 607*b*2 to the output layer 607*c*, and the above-mentioned weight values may be updated during training. In the output layer 607*c*, one output Re($\hat{h}_{n+1}$), Im($\hat{h}_{n+1}$) is illustrated as an example. Weight values are updated during training, and finally, after the training completed, a channel value at the next time point may be estimated as an output value expressed as the sum of values obtained by calculating the weight values and input values processed from the input layer 607*a* to the output layer 607*c*. In the disclosure, weights are updated during training, and, during testing, a channel value at the next time point is estimated by calculating weight values that are output by inputting preprocessed channel vectors.

In the MLP blocks 507 and 607, weight may be updated in a way that minimizes the loss of the cost function during training. Adaptive moment estimation (ADAM) proposed in a well-known study (D. Kingma and J. Ba, "Adam: A method for stochastic optimization," arXiv preprint arXiv: 1412.6980, 2014) may be used as an optimizer for updating the weights. Although the optimizer is not illustrated in the embodiments in FIGS. 5 and 6, the optimizer may be implemented as being included in the MLP blocks 507 and 607. The loss function representing the loss of a cost function is shown as in Equation 15 below that uses, as a variable, the minimum square error (MSE) of an estimated channel value, that is, an estimated channel $\hat{h}_{n+1}$, and a preprocessed channel value, that is, a noise pre-processed channel $g_{n+1}$.

In other words, in the embodiment of the disclosure, the base station may use a multi-layer perceptron (MLP), to which channel vectors preprocessed from received signals are input, to estimate a channel value $\hat{h}_{n+1}$ at a next time point, which minimizes $C_{loss}$ in Equation 15 below.

$$C_{loss} = \frac{1}{N_{train}} \sum_{n=1}^{N_{train}} \|\hat{h}_{n+1} - g_{n+1}\|^2 \qquad \text{Equation 15}$$

The disclosure proposes a method for applying, in channel estimation, a preprocessed channel value, that is, a noise pre-processed channel $g_{n+1}$, to the loss function, instead of $h_{n+1}$ which is an actual channel value at the next time point in training. Since the actual channel value cannot be obtained in the real environment, the preprocessed channel value $g_{n+1}$ that minimizes the effect of noise from the measurement may be used.

Hereinafter, a description will be made of simulation results showing performance comparison of the channel estimation method of the disclosure according to the above-mentioned first to third embodiments.

In this simulation, it was assumed that a channel may be produced based on a spatial channel model (SCM) of 3GPP, and that the number of antennas of a base station M=64. It was assumed that the carrier frequency of the channel is 2.3 GHz and the sampling period is 40 ms. Also, in MLP, 1000 iterations were used for ADAM optimization, and 128 batch size, and 0.001 training rate were assumed.

The normalized mean square error (NMSE) of a channel, used as a performance index, may be expressed as in Equation 16 below.

$$NMSE = \mathbb{E}\left[\frac{\|\hat{h}_{n+1} - h_{n+1}\|^2}{\|\hat{h}_{n+1}\|^2}\right] \qquad \text{Equation 16}$$

Here, $\hat{h}_{n+1}$ may denote the estimated channel value, and hn+1 may denote the actual channel value.

Figure 7:
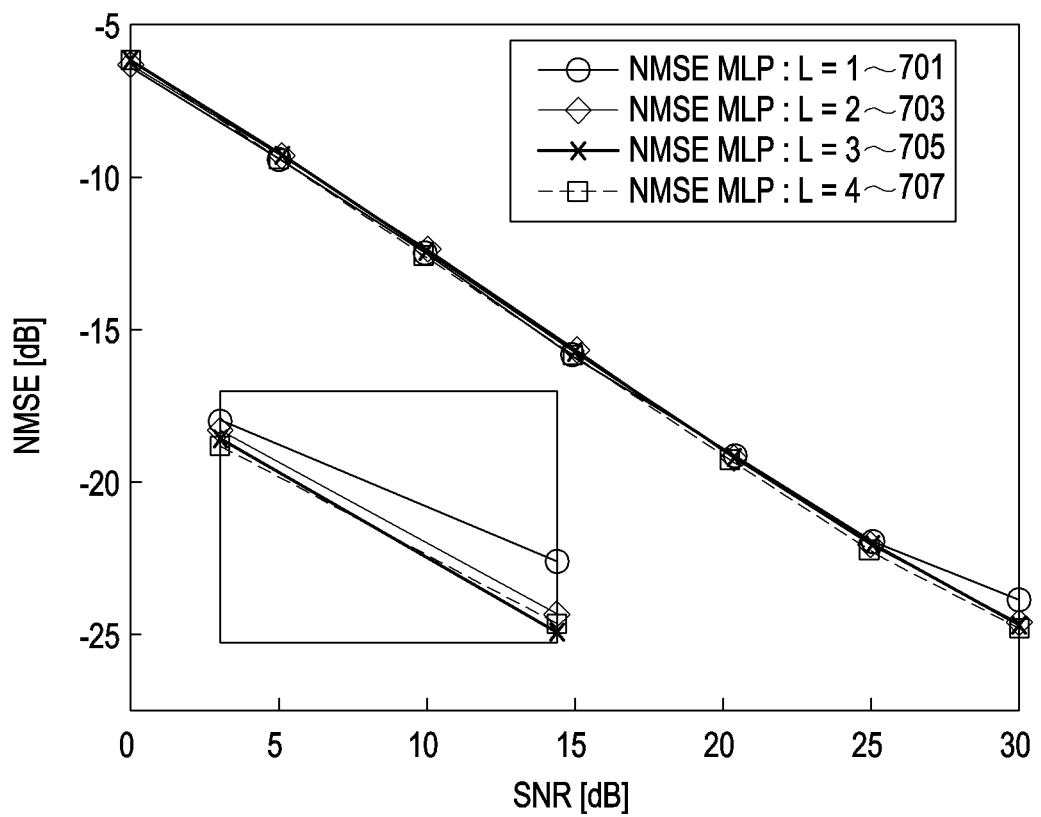
FIG. 7 shows a comparison of NMSE performance according to the number (L) of hidden layers of an MLP according to an embodiment of the disclosure.

FIG. 7 shows a comparison of NMSE performance according to the number (L) of hidden layers of an MLP according to an embodiment of the disclosure.

Referring to FIG. 7, reference numeral 701 denotes a simulation result when the number of hidden layers is 1, and reference numerals 703, 705 and 707 denote simulation results when the number of hidden layers is 2, 3, and 4, respectively.

In FIG. 7, it was assumed that the UE mobility v=3 km/h, input-order I=3, and the number of samples Ns=2048, and the NMSE performance of an MLP was compared according to an SNR. It may be confirmed that the number of hidden layers is effective when L=2 when both performance and complexity are considered, and the case of L=2 was assumed in the following simulation. The accuracy of channel estimation increases as the number of hidden layers increases. However, it may be confirmed through simulation result that, as shown in FIG. 7, the difference in performance in actual channel estimation is small between the case where the number of hidden layers is 2 and the number of hidden layers is 3 or greater, so it is sufficient to use two hidden layers.

Figure 8:
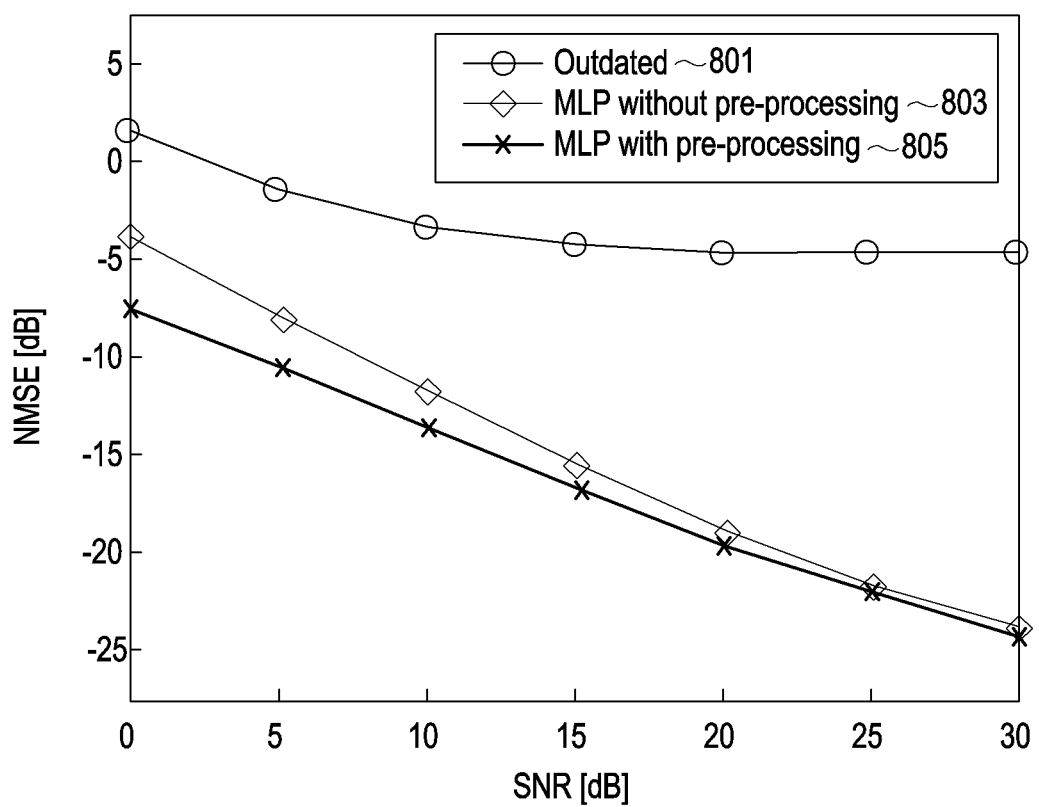
FIG. 8 shows the NMSE of an MLP according to an embodiment of the disclosure.

FIG. 8 shows the NMSE of an MLP according to an embodiment of the disclosure.

In FIG. 8, reference numeral 801 denotes NMSE when an MLP is not applied to a received signal including noise. Reference numeral 803 denotes NMSE when MLP is applied to a received signal including noise without the above-described pre-processing. Reference numeral 805 denotes NMSE when MLP combined with the above pre-processing is applied to a received signal including noise.

The simulation of FIG. 8 shows the comparison of NMSE performance of the machine learning-based channel estimation in Example 3. At this time, it was assumed that the UE mobility v=3 km/h, input-order I=3, and $N_{train}$=2048. Reference number 801 is the performance of an outdate channel to which MLP is not applied, and the outdate channel may be expressed as $$\hat{h}_{n+1}^{outdate} = h_n + \frac{1}{\sqrt{\rho}} w_n.$$

Figure 9:
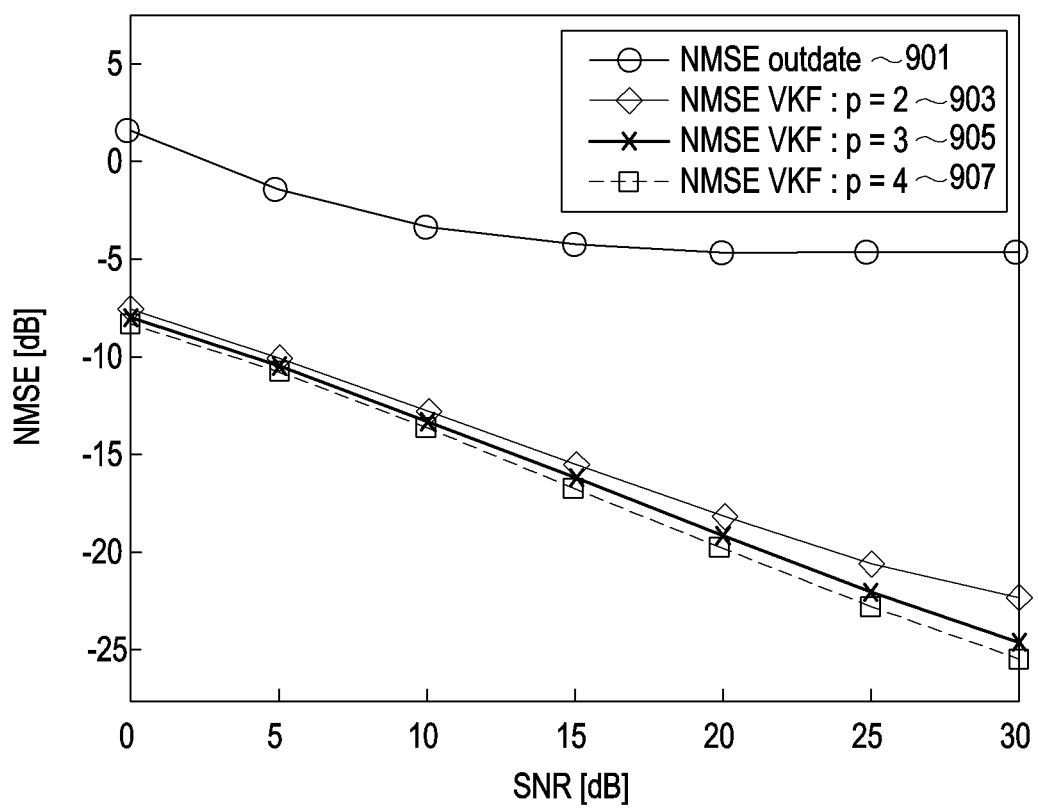
FIG. 9 shows an NMSE based on a complexity order, AR-order p, in Kalman filter-based channel estimation according to an embodiment of the disclosure.

Referring to FIG. 8, it may be confirmed that the performance of a noise pre-processed MLP of reference number 805 has a 3 dB gain in a low SNR (SNR=0 dB) region compared to the performance of an MLP in which noise pre-processing is not performed in reference number 803. FIG. 9 shows an NMSE based on a complexity order, AR-order p, in Kalman filter-based channel estimation according to an embodiment of the disclosure.

Referring to FIG. 9, reference numeral 901 shows the NMSE in the case where the Kalman filter is not applied to a received signal including noise. Reference numeral 903 denotes an NMSE result in the case in which the complexity order is 2 when the Kalman filter is applied, and reference numerals 905 and 907 denote MSE when the complexity orders are 3 and 4 when the Kalman filter is applied, respectively. Here, it is assumed that the UE mobility v=3 km/h and Ns=2048. As AR-order increases, performance is improved, but complexity is also increased. Therefore, AR-order, which is an optimal complexity order, may exist, and referring to FIG. 9, it may be found that when the AR-order is 3, both complexity and performance are satisfied.

Figure 10:
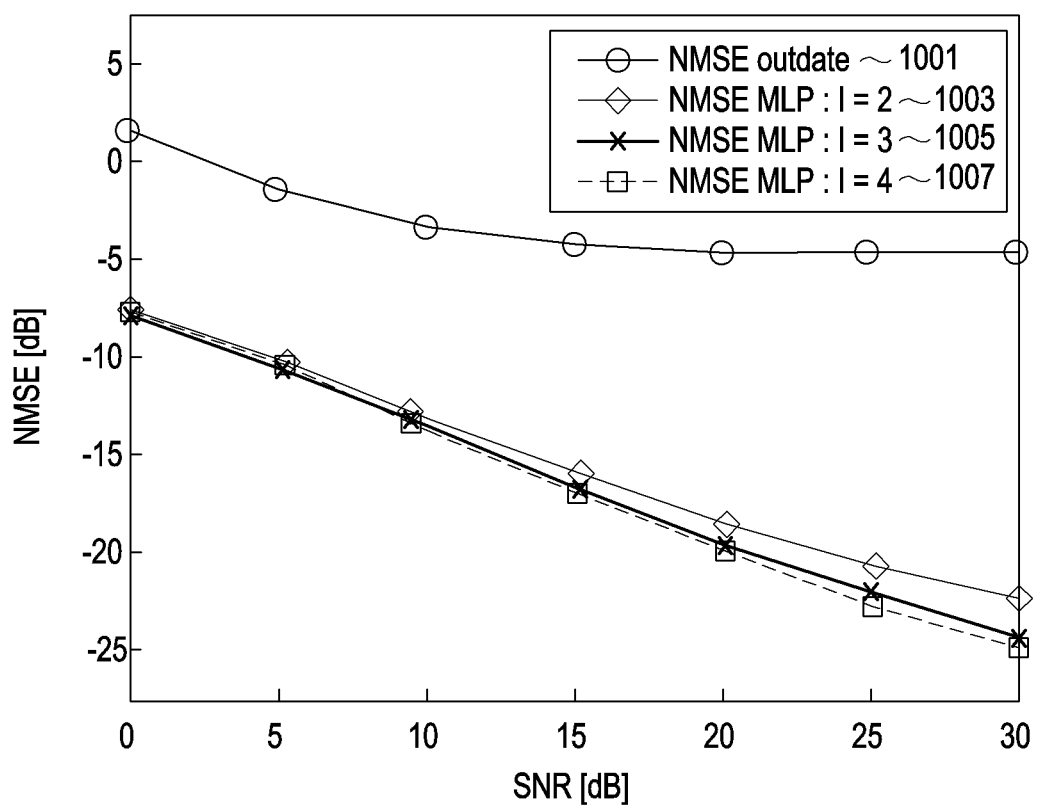
FIG. 10 shows an NMSE based on a complexity order, input-order I, in machine learning-based channel estimation according to an embodiment of the disclosure.

FIG. 10 shows an NMSE according to a complexity order, input-order I, in machine learning-based channel estimation according to an embodiment of the disclosure.

Referring to FIG. 10, reference numeral 1001 shows NMSE in the case where an MLP is not applied to a received signal including noise. Reference numeral 1003 denotes an NMSE result in the case in which the complexity order is 2 when the MLP is applied, and reference numerals 1005 and 1007 denote NMSE in the cases in which the complexity orders are 3 and 4 when MLP is applied, respectively.

Figure 11:
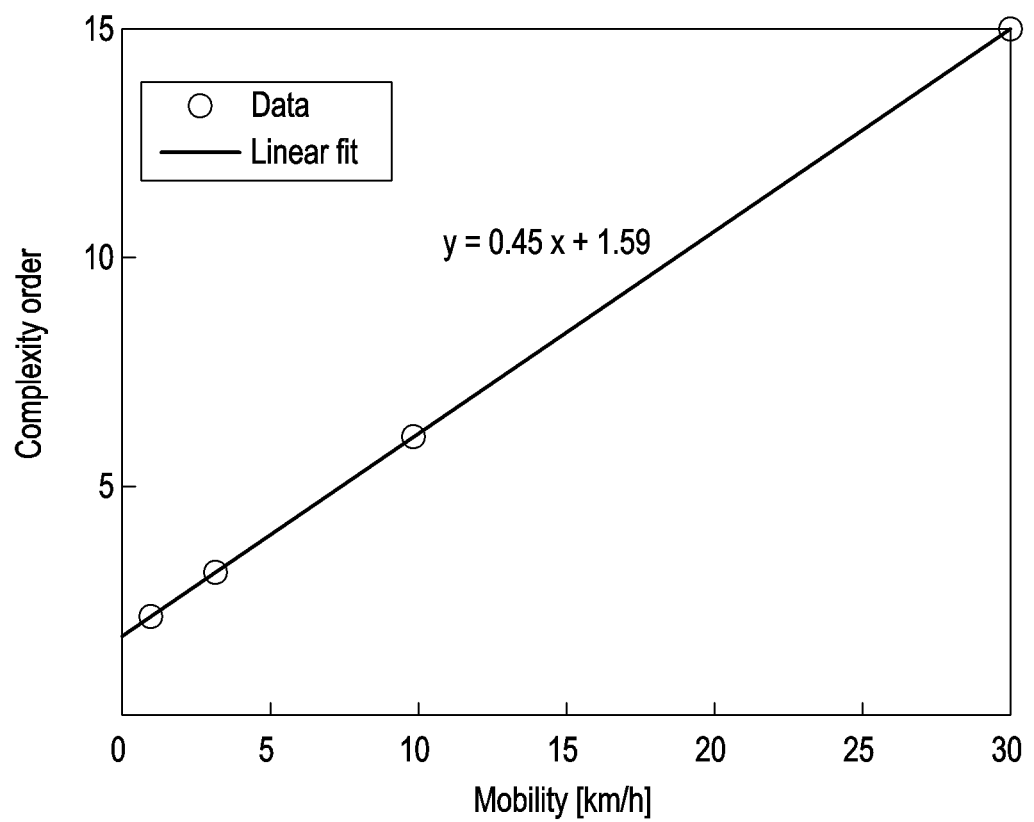
FIG. 11 shows a linear relationship of a complexity order according to UE mobility when estimating a channel according to an embodiment of the disclosure.

Here, it was assumed that the UE mobility v=3 km/h and $N_{train}$=2048. As an input-order, which is the complexity order, increases, performance is improved, but complexity is also increased, so an input-order, which is an optimal complexity order, may exist. Referring to FIG. 10, it may be found that both complexity and performance are satisfied when the input-order, which is the complexity order, is 3. FIG. 11 shows a linear relationship of a complexity order according to UE mobility when estimating a channel according to an embodiment of the disclosure.

As in Example 1 to Example 3, the optimal complexity order (AR-order and input-order) may be determined according to UE mobility in Kalman filter-based and machine learning-based channel estimation. Referring to FIG. 11, it was confirmed that there is a correspondence between the optimal complexity order and the UE mobility, complexity order=f (mobility), and, for example, the correspondence may be expressed as complexity order≈½ mobility [km/h]. That is, the complexity order may be expressed as a function that takes UE mobility as an input. FIG. 11 shows as an example in which the UE mobility and the complexity order may be expressed as a linear function. In addition, a UE mobility value may be estimated through the UE mobility estimation method in Embodiment 1, and the complexity order may be determined by using the estimated UE mobility value.

Figure 12:
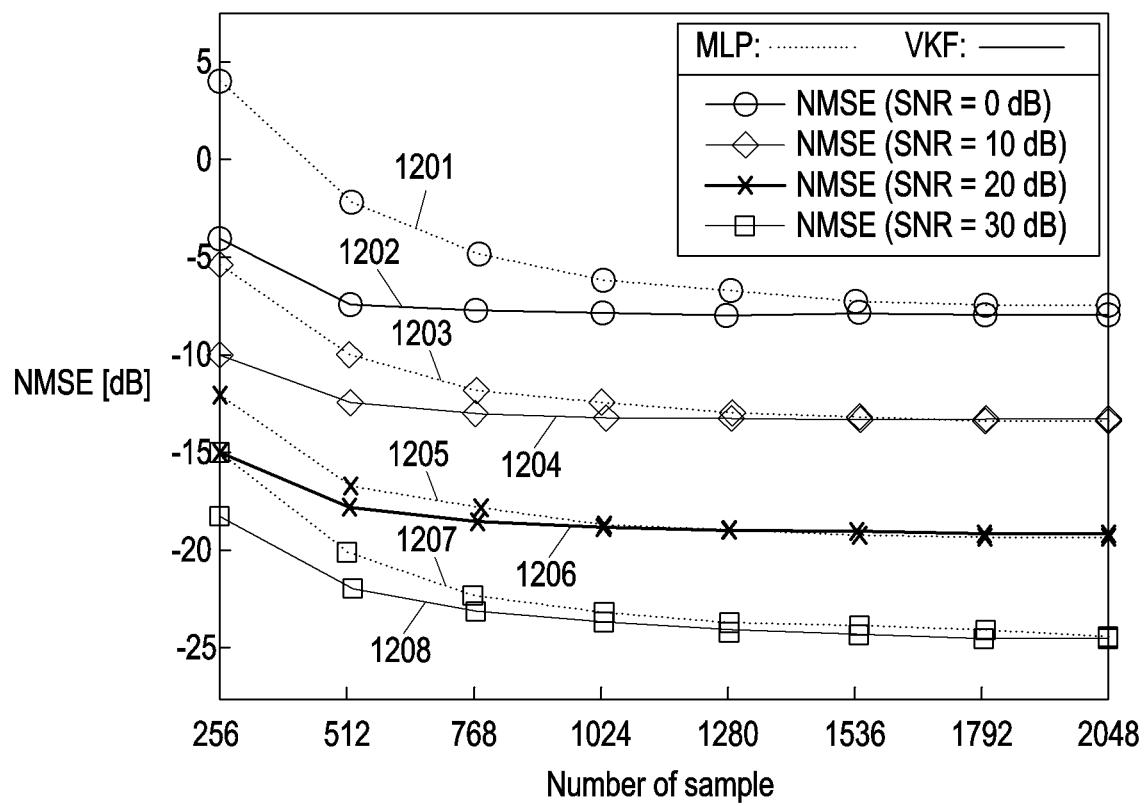
FIG. 12 shows an NMSE based pm the number of samples in channel estimation according to an embodiment of the disclosure.

FIG. 12 shows an NMSE based on the number of samples in channel estimation according to an embodiment of the disclosure.

Reference numerals 1201 and 1202 in FIG. 12 show an MLP and an NMSE based on the number of samples in Kalman filter-based channel estimation when the SNR is 0 dB, respectively. Reference numerals 1203 and 1204 show an MLP and an NMSE based on the number of samples in Kalman filter-based channel estimation when the SNR is 10 dB, respectively. Reference numerals 1205 and 1206 show an MLP and an NMSE based on the number of samples in Kalman filter-based channel estimation when the SNR is 20 dB, respectively, and reference numerals 1207 and 1208 show an MLP and an NMSE based on the number of samples in Kalman filter-based channel estimation when the SNR is 30 dB, respectively.

Here, it was assumed that the UE mobility v=3 km/h and p=I=3. Referring to FIG. 12, it may be confirmed that the performance is saturated when the number of samples is 512 in the case of Kalman filter-based channel estimation, and it may be confirmed that the performance is saturated when the number of samples is 1024 in the case of machine learning-based channel estimation. Therefore, it was found that each of the channel estimation methods proposed in the disclosure may use the optimal number of samples, at which the performance is saturated, to reduce complexity and obtain optimal performance.

Figure 13:
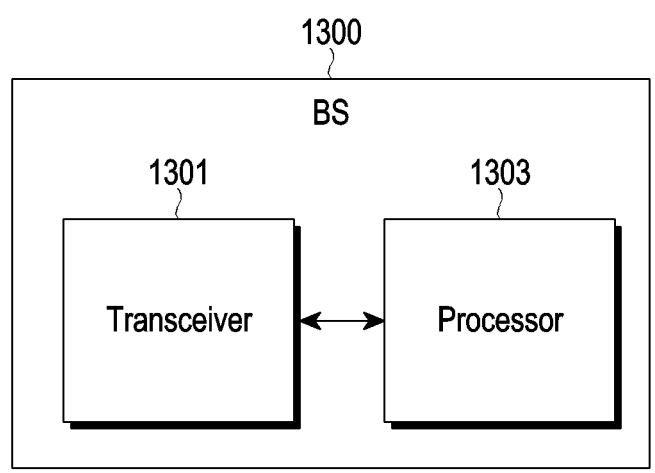
FIG. 13 is a device diagram illustrating inner elements of a base station according to an embodiment of the disclosure.

FIG. 13 is a device diagram illustrating elements of a base station according to an embodiment of the disclosure.

In the embodiments of the disclosure described with reference to FIGS. 1 to 12, operations of estimating the mobility of a UE and estimating a reverse channel of the UE based on the estimated mobility may be performed by the base station. Referring to FIG. 13, a base station 1300 may be implemented as including a transceiver 1301 and a processor 1303. Here, the processor 1303 may transmit and receive a wireless signal through the transceiver 1301. In addition, the processor 1303 may control the device overall such that the base station estimates the mobility of the UE according to the method described in the embodiments of FIGS. 1 to 12 and estimates a channel based on the mobility.

The invention claimed is:

1. A method for estimating a channel of a user equipment (UE) by a base station in a wireless communication system supporting multiple antennas, the channel estimation method comprising:

estimating a movement speed of the UE, based on a first channel value obtained at a current time point and a second channel value obtained at a previous time point;

determining, based on the estimated movement speed, a complexity order corresponding to the number of channel values for multiple time points comprising the current time point; and estimating a channel of the UE at a next time point, based on the determined complexity order.

2. The channel estimation method of claim 1, wherein the complexity order is proportional to an amount of change in a channel according to movement of the UE.

3. The channel estimation method of claim 1, wherein the complexity order corresponds to the number of multiple signals received from the UE through multiple channels at the multiple time points, and wherein the complexity order is determined by a ratio value of the movement speed.

4. The channel estimation method of claim 1, wherein the estimating of the channel at the next time point further comprises preprocessing the multiple received signals to obtain multiple channel vectors, and wherein the preprocessing uses a linear minimum mean square error estimation (LMMSE) method.

5. The channel estimation method of claim 4, wherein the estimating of the channel at the next time point further comprises estimating the channel at the next time point through a multi-layer perceptron (MLP) into which the multiple channel vectors obtained through the preprocessing are input, and wherein the MLP has a structure comprising at least one hidden layer for updating multiple weights used to estimate the channel at the next time point.

6. The channel estimation method of claim 5, further comprising:
   training through which multiple weights are updated in the MLP,
   wherein the multiple weights are updated such that a channel value at the next time point, at which a loss of a cost function is minimized in the training, is estimated.

7. The channel estimation method of claim 1, wherein the estimating of the channel at the next time point further comprises estimating a channel value at the next time point by using a channel value at the current time point and a channel value at the previous time point through a Kalman filter.

8. A base station for estimating a channel of a user equipment (UE) in a wireless communication system supporting multiple antennas, the base station comprising:
   a transceiver; and
   a processor,
   wherein the processor is configured to:
      estimate a movement speed of the UE, based on a first channel value obtained at a current time point and a second channel value obtained at a previous time point,
      determine, based on the estimated movement speed, a complexity order corresponding to the number of channel values for multiple time points comprising the current time point, and
      estimate a channel of the UE at a next time point, based on the determined complexity order.

9. The base station of claim 8, wherein the complexity order is proportional to an amount of change in a channel according to movement of the UE.

10. The base station of claim 8,
    wherein the complexity order corresponds to the number of multiple signals received from the UE through multiple channels at the multiple time points, and
    wherein the processor is configured to determine the complexity order by a ratio value of the movement speed.

11. The base station of claim 8,
    wherein the processor is configured to preprocess the multiple received signals to obtain multiple channel vectors, and
    wherein the preprocessing uses a linear minimum mean square error estimation (LMMSE) method.

12. The base station of claim 11,
    wherein the processor is configured to estimate the channel at the next time point through a multi-layer perceptron (MLP) into which the multiple channel vectors obtained through the preprocessing are input, and
    wherein the MLP has a structure comprising at least one hidden layer for updating multiple weights used to estimate the channel at the next time point.

13. The base station of claim 12, wherein the processor is configured to:
    update multiple weights in the MLP through training; and
    update the multiple weights such that a channel value at the next time point, at which a loss of a cost function is minimized in the training, is estimated.

14. The base station of claim 8, wherein the processor is configured to estimate a channel value at the next time point by using a channel value at the current time point and a channel value at the previous time point through a Kalman filter.

15. The base station of claim 8, wherein the processor is configured to:
    calculate a minimum prediction mean square error (MSE) matrix such that a channel value at the next time point is estimated or corrected using a channel value at the current time point;
    determine a Kalman gain matrix by using the estimated MSE matrix; and
    estimate the channel at the next time point by using the Kalman gain matrix.

* * * * *